T. E. SPENCER.
MOUSETRAP.
APPLICATION FILED FEB. 9, 1920.

1,391,589.

Patented Sept. 20, 1921.
2 SHEETS—SHEET 1.

WITNESS:
R. A. Thomas

INVENTOR.
T. E. Spencer
BY
Victor J. Evans
ATTORNEY.

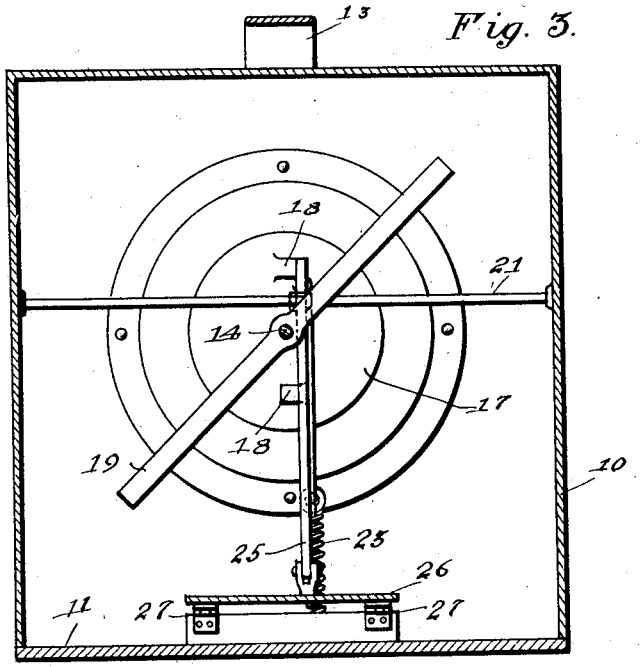
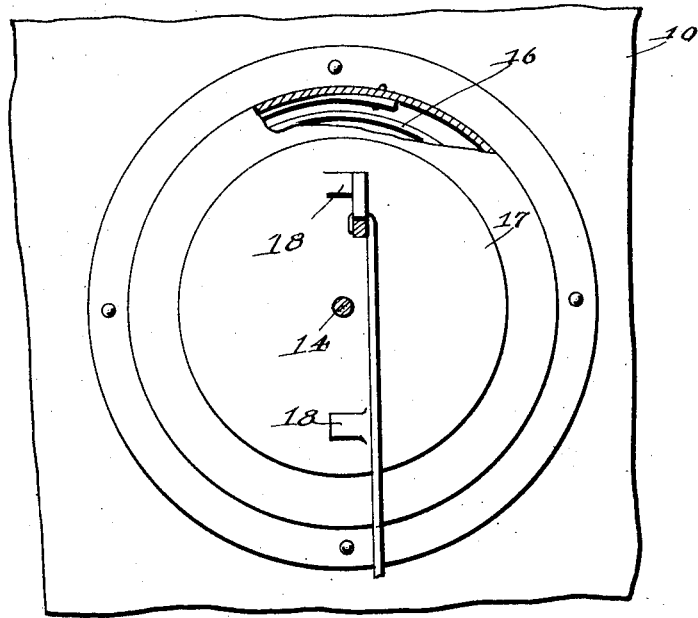

UNITED STATES PATENT OFFICE.

THOMAS E. SPENCER, OF WETASKIWIN, ALBERTA, CANADA.

MOUSETRAP.

1,391,589.   Specification of Letters Patent.   Patented Sept. 20, 1921.

Application filed February 9, 1920. Serial No. 357,395.

*To all whom it may concern:*

Be it known that I, THOMAS E. SPENCER, a citizen of Canada, residing at Wetaskiwin, in the Province of Alberta and Dominion of Canada, have invented new and useful Improvements in Mousetraps, of which the following is a specification.

This invention relates to animal traps, particularly to traps adapted for catching mice, gophers, and the like, and has for its object the provision of a trap embodying a spring wound shaft member carrying a pair of trigger arms whereby when the trigger mechanism is released by a mouse stepping upon a platform, the shaft will be released so that one trigger will strike the mouse upon or near his head and break his neck, and another trigger member disposed exteriorly of the trap will knock the body away so as to permit entrance of other mice to the trap, the trap being continuously ready for operation until the spring is entirely unwound.

An important object is the provision of a trap of this character which will automatically reset itself after each mouse is killed so that the trap is adapted for the killing of a great number of mice without any attention other than originally winding the spring.

Another object is the provision of a trap of this character which will be simple and inexpensive in manufacture, which will be highly efficient in use, durable in service, and a general improvement in the art.

With the above and other objects and advantages in view, the invention consists in the details of construction to be hereinafter more fully described and claimed and illustrated in the accompanying drawings in which—

Fig. 3 is a cross sectional view on the line 3—3 of Fig. 2, and Fig. 4 is a cross sectional view on the line 4—4 of Fig. 2.

Figure 1:
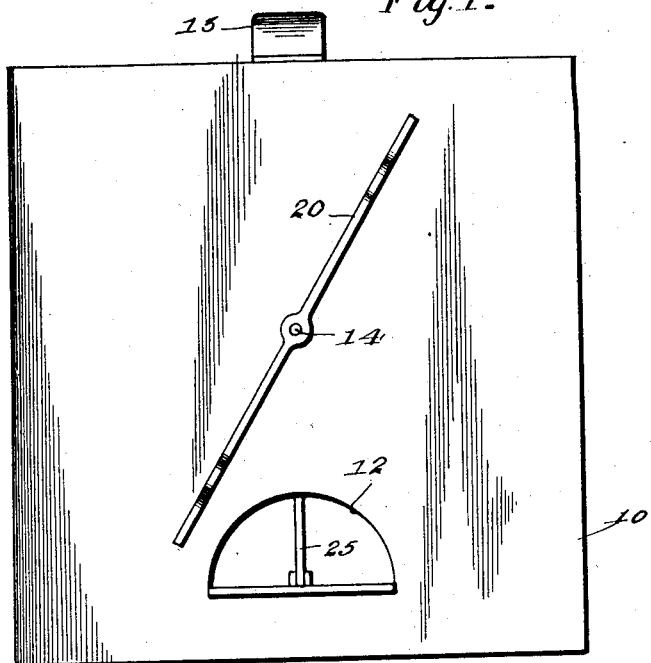
Figure 1 is a front elevation of the trap.
Figure 2:
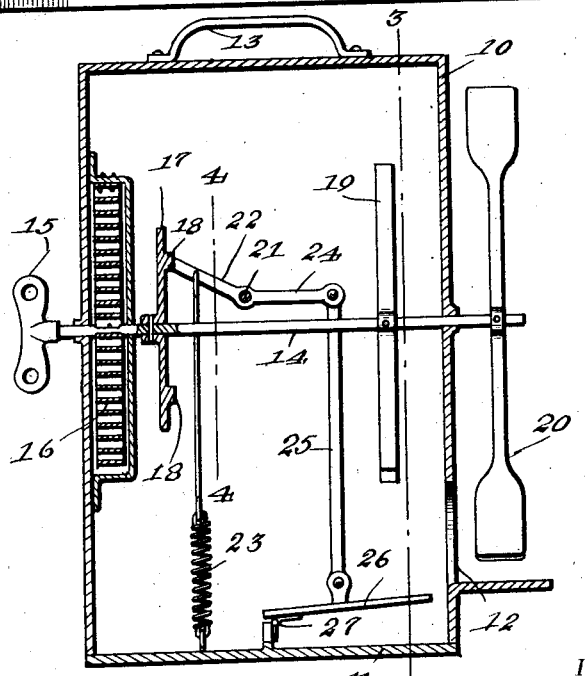
Fig. 2 is a longitudinal sectional view therethrough, taken at right angles to Fig. 1.

Referring more particularly to the drawings, the numeral 10 designates a rectangular casing mounted upon a suitable base 11 and provided in its front with an entrance opening 12. The casing has secured upon its top a suitable handle 13 by means of which it may be conveniently carried from place to place.

Journaled through the casing 10 is a shaft 14 which is provided at one end with a winding key 15 and upon which is secured one end of a spiral spring 16 which has its other end secured to the casing. Also secured upon the shaft 14 is a block or disk 17 provided on one face with a plurality of stops 18. Mounted upon the shaft 14 interiorly of the casing is a striker arm 19 and also mounted upon the outer end of the shaft 14 at the wall of the casing provided with the opening 12, is a second striker arm 20.

Extending through the casing 10 slightly above and at right anges to the shaft 14, is a shaft 21 upon which is pivoted a trigger member including an arm 22 engageable by the stops 18 on the block 17 and serving as a pawl for holding the spring 16 under tension, the stops 18 on the member 17 constituting a ratchet. A coil spring 23 is connected with the trigger arm 22 and with the bottom of the casing for normally pulling the arm 22 downwardly in position to be engaged by a stop 18. This trigger member further includes an arm 24 to the end of which is pivoted a link 25 which extends downwardly and which is pivotally connected at its other end with a platform 26 pivoted, as shown at 27, at its rear end. The platform 26 is disposed adjacent the entrance opening 12 so as to be stepped upon by an animal entering the trap. Any suitable bait may be disposed at a suitable location within the trap to attract animals.

In the operation of the device, the operator first grips the key 15 and rotates the shaft 14 to place the spring 16 under tension, the stop 18 on the member 17 coöperating with the trigger arm 22 to perform a ratchet function. After the spring is thus wound and suitable bait placed within the trap, the trap is ready for use without further attention. When an animal enters the opening 12 and steps upon the platform 26 in an endeavor to reach the bait, the weight upon the platform 26 will rock the same downwardly which will cause a pull upon the link 25 which will result in moving the trigger arm 24 downwardly against the resistance of the spring 23. This downward movement of the arm 24 results in upward movement of the arm 22 whereupon the arm 22 will be moved out of obstructing position with relation to the stops 18 whereupon the member 17 and shaft 14 will be rotated through an arc of a circle, the size of the arc depending upon the distance between the stops 18. As this shaft 14 is thus partially rotated, the striker arm 19 will be swung violently across the platform 26 and the length of this striker arm is such that during this movement it will strike the head or neck of the mouse or other animal and either crush the skull or break the neck. The striker arm 20 is somewhat angularly disposed with relation to the striker arm 19 so that as the shaft 14 is partially rotated, the striker arm 20 will pass violently across the entrance opening 12 after the striker arm 19 has passed over the platform and in this movement the striker arm 20 will engage the body of the animal and knock it out of the way to one side of the trap so as to leave the entrance opening 12 unobstructed to permit the entrance of other animals. As soon as the body is knocked away and its weight removed from the platform 26 the tension of the spring 23 will pull the trigger arm 22 downwardly into obstructing relation to the stops 18 so that during the rotation of the member 17 the next succeeding stop will engage the trigger arm 22 and thus prevent further rotation of the shaft 14 until the trap is again sprung by an animal engaging the platform 26.

From the foregoing description and a study of the drawings it will be apparent that I have thus provided a very simple trap which, after being once set, will be automatic in its action so that after killing an animal it will automatically return to its proper position for killing subsequent animals without further attention on the part of the operator. It will thus be apparent that the device will be readily adapted for use in killing a large number of animals in an efficient and reliable manner and will be a labor saver.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A trap of the character described comprising a casing provided with an entrance opening, a rotary shaft journaled through said casing, spring tension on said shaft tending to rotate the same in one direction, a platform pivoted within said casing, a trigger member having operative connection with said shaft and normally preventing rotation thereof, and striker arms carried by said shaft, depression of said platform resulting in partial rotation of said shaft whereby to cause said striker arms to pass, one above and across said platform and the other across said entrance opening exteriorly of the casing.

2. A device of the character described comprising a casing provided with an entrance opening, a shaft journaled through said casing, a spiral spring connected with said shaft and with said casing, a winding key on one end of said shaft, a member carried by said shaft and provided with a plurality of stops extending beyond one face thereof, a trigger member pivoted within said casing and having an arm disposed in the path of travel of and engaging any one of said stops, a pair of striker arms carried by said shaft, one being disposed within and the other exteriorly of said casing, and a pivoted platform within said casing adjacent said entrance opening and connected with said trigger arm whereby upon depression of said platform said trigger arm will be released from engagement with said stop whereby said shaft will be partially rotated to bring said striker arms across said platform and said opening at different times.

3. A trap of the character described comprising a casing provided with an entrance opening, a shaft journaled through said casing and provided at one end with a winding key, a spiral spring having one end secured to said shaft and its other end secured to said casing, a member carried by said shaft and provided with a plurality of stops, a trigger member pivoted within said casing and including an arm disposed in the path of travel of and engageable successively by said stops, said trigger member including a second arm, a platform pivoted within said casing adjacent said entrance opening, a link connected with said platform and the second named arm of said trigger member, a spring connected with said first named trigger arm and with said casing for normally holding said first named trigger arm in the path of travel of said stops, a striker arm carried by said shaft interiorly of said casing, and a second striker arm carried by said shaft exteriorly of said casing and arranged at an arc with respect to said first named striker arm, depression of said platform resulting in movement of said first named trigger arm out of the path of movement of said stops whereby to permit rotation of said shaft, said first named striker arm swinging across said platform in spaced relation thereto and said second named striker arm passing across said entrance opening subsequent to the passage of said first named striker arm across said platform.

In testimony whereof I affix my signature.

THOS. E. SPENCER.